(12) United States Patent
Sarkar et al.

(10) Patent No.: US 8,213,361 B1
(45) Date of Patent: Jul. 3, 2012

(54) USING LOAD UNDER ONE AIR INTERFACE PROTOCOL AS A BASIS TO ACTIVATE A CONTROL CHANNEL UNDER ANOTHER AIR INTERFACE PROTOCOL

(75) Inventors: Debasish Sarkar, Irvine, CA (US); Sachin R. Vargantwar, Overland Park, KS (US); Siddharth S. Oroskar, Overland Park, KS (US); Deveshkumar Rai, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 481 days.

(21) Appl. No.: 12/479,382

(22) Filed: Jun. 5, 2009

(51) Int. Cl.
*H04W 4/00* (2009.01)
(52) U.S. Cl. ...................................................... 370/328
(58) Field of Classification Search .................. None
See application file for complete search history.

(56) References Cited

U.S. PATENT DOCUMENTS

| | | | |
|---|---|---|---|
| 6,650,873 B2* | 11/2003 | Chen et al. | 455/69 |
| 7,471,961 B2* | 12/2008 | Fabien et al. | 455/519 |
| 7,949,307 B2* | 5/2011 | Ode | 455/69 |
| 2003/0008691 A1 | 1/2003 | Chen et al. | |
| 2003/0125039 A1* | 7/2003 | Lachtar et al. | 455/453 |
| 2004/0072565 A1* | 4/2004 | Nobukiyo et al. | 455/436 |
| 2008/0096585 A1* | 4/2008 | Willey | 455/458 |
| 2009/0232102 A1* | 9/2009 | Zhang et al. | 370/335 |

* cited by examiner

Primary Examiner — Anh-Vu Ly

(57) ABSTRACT

Air interface protocols under the numerous wireless communication standards allow use of a quick-paging channel (QPCH) to expedite paging and call setup. When a hybrid mobile device is engaged in wireless communications under a first air interface protocol, it may periodically switch over to a second air interface protocol to check for pages on the slower standard paging channel (PCH). To increase throughput under the first air interface protocol, it would be useful to employ the QPCH under the second air interface protocol, to reduce time spent by hybrid device checking for pages under the second air interface protocol. However, the QPCH uses resources under the second air interface protocol, so it would be best to not have the QPCH activated at all times. According to the invention, the system would activate the QPCH under the second air interface protocol in response to there being more than an upper threshold number of hybrid devices active under the first air interface protocol. In turn, the system may deactivate the QPCH under the second air interface protocol in response to there being some lower threshold number of hybrid devices active under the first air interface protocol.

18 Claims, 3 Drawing Sheets

USING LOAD UNDER ONE AIR INTERFACE PROTOCOL AS A BASIS TO ACTIVATE A CONTROL CHANNEL UNDER ANOTHER AIR INTERFACE PROTOCOL

BACKGROUND

In wireless communication system, particularly a cellular radio communication system, mobile devices operating on the system may wirelessly communicate with the communication network over a variety of air interface protocols. When wireless communication systems, and their associated mobile devices, operate under multiple air interface protocols, the devices and systems may be referred to respectively as hybrid mobile devices and hybrid communication systems. As an example of hybrid communication, a hybrid mobile device may use a first protocol for high speed data communications with the network, such as Internet browsing or e-mail exchange, and the hybrid mobile device may use a second protocol for voice calls and low speed data communications with the network, such as receiving and sending Short Message Service (SMS) messages.

A common aspect of some hybrid communication systems is that the hybrid mobile devices cannot operate over multiple air interface protocols simultaneously; the devices are limited to communicating over only one air interface protocol for any given time period and must switch between the protocols periodically. For example, while a hybrid mobile device is receiving high data rate communications over a first protocol, the hybrid device may have to periodically interrupt the transmission to switch over to a second protocol to check for incoming voice calls.

Typically a mobile device, whether a hybrid device or not, will check for incoming calls on a control channel that operates under the second protocol and that carries signaling messages transmitted from the network to the mobile devices. Most commonly, the control channel is a paging channel (PCH) that carries pages messages for the mobile devices. A mobile device will listen to the paging channel for pages addressed to the mobile device and then it may act on any pages it receives. For example, the mobile device may receive a page that a voice call is waiting to be connected and then the mobile device may act to set up the voice call on the network.

Paging channels, and the page messages carried on them, may carry a significant amount of information, including detailed network overhead information. Because so much information is carried on the paging channels, and because page messages for all the mobile devices on the network are typically carried sequentially in time over the paging channel, it may take a substantial amount of time for any given mobile device to check for its own pages. Additionally, and particularly if the page message is long, the mobile device may not receive the entire page message on its first attempt to listen to the message. When that occurs, the mobile device must wait until the page message is repeated on the paging channel in order to receive the entire contents of the page message.

Because the act of listening for page messages may take a significant amount of time, some wireless communication systems may employ a second control channel, frequently known as a quick paging channel (QPCH), which may use quick page messages to tell a mobile device that it should monitor the paging channel for a page message. Unless the mobile device receives a quick page message from the quick paging channel, it need not listen to the paging channel.

The quick paging channel carries significantly less information than the paging channel, and the quick pages carried by the quick paging channel can be listened to very quickly.

Further, quick paging channels may frequently operate in a slotted mode, in which each mobile device is assigned a particular repeating time slot on the quick paging channel. Consequently, each mobile device need only listen to the quick paging channel during its assigned time slot, thereby reducing the time spent listening to the quick paging channel. (Though paging channels may also operate on a slotted basis, the assigned time slots are typically much longer and carry more information than the time slots assigned on a quick paging channel.) The net benefit of a quick paging control channel is that it reduces the amount of time the mobile device must spend listening to the network to see if it must take further action on the network.

This reduction in time is particularly useful to hybrid mobile devices, which must interrupt their communication under a first protocol in order to switch over to a second protocol to check for messages. The presence of a quick paging channel under the second protocol reduces the hybrid mobile device's time away from the first protocol.

OVERVIEW

Every wireless communication system has only limited network resources. For example, every wireless communication system has limited transceiver power with which to broadcast to mobile devices, and each broadcast additional channel that the network activates uses some of that broadcast power. Further, every network has limited broadcast bandwidth. For example, each active channel may exclusively occupy a given amount of finite frequency spectrum. Alternatively or additionally, each active channel may require one of a limited number of modulation codes in a code-modulated wireless network, such as Walsh codes in a Code Division Multiple Access (CDMA) network, and/or each channel may require one of a limited number of time slots in a slotted network, such as a Time Division Multiple Access (TDMA) network.

Because each active control channel uses network resources, it is not always desirable for a network to have a multitude of control channels (e.g., a paging channel plus a quick paging channel) in operation at all times. Preferably, a means should exist by which a wireless communication network can determine when to selectively activate a control channel such as a quick paging channel. Because hybrid wireless mobile devices are particularly sensitive to the presence of quick paging channels, it is preferable that the means considers whether, and to what extent, hybrid mobile devices are communicating on the network.

Disclosed herein are methods and systems for activating a control channel under one air interface protocol on a network based on the quantity of hybrid mobile devices operating under another air interface protocol on the network. For example, a network entity may determine a quantity of hybrid mobile devices in a wireless coverage area served by a radio access network (RAN) that are communicating with the RAN under a first air interface protocol, where each hybrid mobile device is capable of communicating with the RAN under the first air interface protocol and under a second air interface protocol. The network entity may then determine that the quantity exceeds an activation threshold value. Responsive to the determination that the quantity exceeds the activation threshold value, the network entity may activate a control channel signal for the wireless coverage area under the second air interface protocol. Additionally, the network entity may later determine that the quantity of hybrid mobile devices in the wireless coverage area that are communicating with the RAN under the first air interface protocol is below a deactivation threshold value. Responsive to the determination that the quantity is below the deactivation threshold value, the network entity may deactivate the control channel signal.

These and other aspects, advantages, and alternatives will become more apparent to those of ordinary skill in the art by reading the following detailed description, with reference where appropriate to the accompanying drawings. Further, it should be understood that this summary and other descriptions throughout this document are intended to explain the invention by way of example only and are not intended to restrict the scope of the invention as claimed.

DETAILED DESCRIPTION

For purposes herein, any reference to a mobile device means a hybrid mobile device, unless explicitly stated otherwise. Likewise, any reference to a wireless communication system means a hybrid wireless communication system, unless explicitly stated otherwise.

While one or more embodiments may be discussed generally in the context of CDMA wireless communication systems, it will be appreciated that the disclosed methods and systems are not limited in this respect and that the methods and systems may be implemented in any number of types of wireless communication systems, such as time division multiple access (TDMA) systems, global system for mobile communications (GSM) systems, or Worldwide Interoperability for Microwave Access (WiMAX or IEEE 802.16), for example. As in most telecommunication and data applications, it will also be appreciated that many of the elements of the various embodiments described herein are functional entities that may be implemented with hardware, firmware and/or software. Additionally, many of these elements may be implemented as discrete components or in conjunction with other components, in any suitable combination and location.

Figure 1:
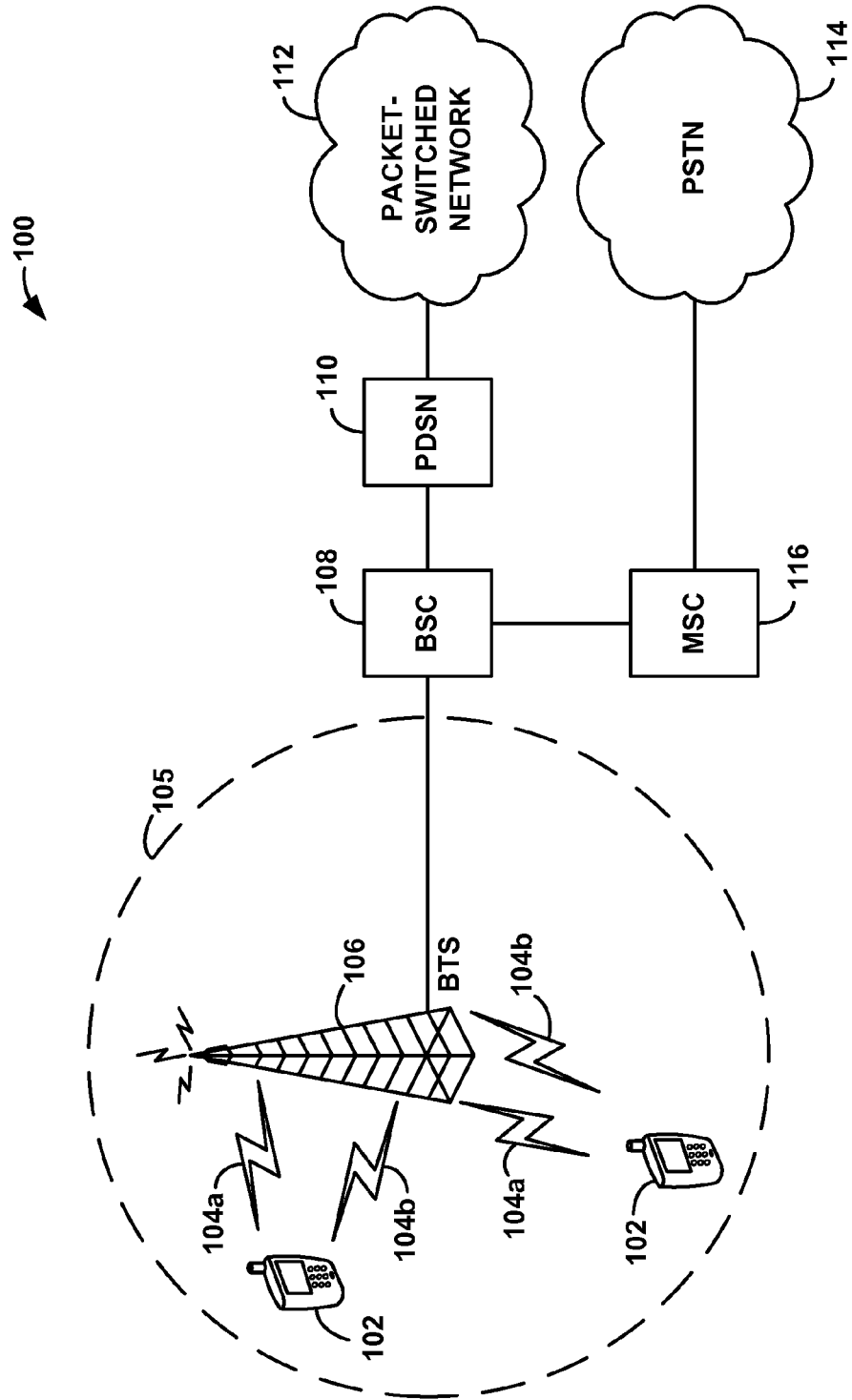
FIG. 1 is a simplified block diagram of a hybrid wireless communication system in which exemplary embodiments of the invention can be employed.

FIG. 1 depicts an example cellular wireless communication system 100, also referred to as a radio access network (RAN), adapted to provide wireless communication service for a plurality of mobile devices 102. A base transceiver station (BTS) 106 in RAN 100 may radiate a radio-frequency signal to define a wireless coverage area 105. Additionally or alternatively, and not shown in FIG. 1, multiple BTSs in RAN 100 may radiate radio-frequency signals to define the wireless coverage area 105. Mobile devices 102 within wireless coverage area 105 may wirelessly communicate with RAN 100 through BTS 106 under a plurality of air interface protocols, as depicted by a first air interface protocol 104a and a second air interface protocol 104b. BTS 106 may be coupled or integrated with a base station controller (BSC) 108. Throughout the remainder of this description, the term "base station" will refer to a RAN element in wireless communication with mobile devices 102, such as BTS 106, BSC 108, or a combination of BTS 106/BSC 108, for instance.

BSC 108 may be coupled with a PDSN 110, which may provide connectivity with a packet-switched network 112 such as the Internet and/or a wireless carrier's private core packet-network. BSC 108 may also be coupled with a mobile switching center (MSC) 116, which may provide connectivity with a public switched telephone network (PSTN) 114. In practice, BSC 108 may serve multiple BTSs 106 and MSC 116 may serve multiple BSCs 108.

Mobile devices 102 may be communicating with BTS 106 under the first air interface protocol 104a, while also periodically switching over to the second air interface protocol 104b to check for page message on a paging channel broadcast by BTS 106 under the second air interface protocol 104b. When the number of mobile devices 102 is relatively small, a network entity, such as BSC 108, MSC 116, or some other network entity, may determine that it is not efficient to use network resources to broadcast an additional control channel, such as a quick paging channel, in addition to the paging channel. However, as the number of mobile devices 102 grows, the network entity may decide that the benefit gained by the larger number of mobile devices 102 that would use the additional control channel under the second air interface protocol 104b justifies the activation of an additional control channel.

In practice, the network entity may determine a quantity of hybrid mobile devices 102 in wireless coverage area 105 served by RAN 100 that are communicating with RAN 100 under a first air interface protocol 104a, but that are also capable of communicating with RAN 100 under a second air interface protocol 104b. The network entity may then determine whether the quantity exceeds some activation threshold value. The activation threshold value may be a specific value set by the RAN 100 administrator, or the activation threshold value may be a calculated or dynamic value based on network parameters, such as a percentage of total mobile devices 102 serviceable by RAN 100, or some other parameter.

Responsive to a determination that the quantity exceeds the activation threshold value, the network entity may activate a control channel signal directed to wireless coverage area 105 and operating under the second air interface protocol 104b. Preferably, the control channel signal would be a quick paging channel, though other options are possible, such as additional paging channels or other types of channels.

The network entity may later determine whether the quantity of mobile devices 102 accessing wireless coverage area 105 under the first air interface protocol 104a is below a deactivation threshold value. The deactivation threshold value may be a specific value set by the RAN 100 administrator or the activation threshold value may be a calculated or dynamic value based on network parameters, such as a percentage of total mobile devices 102 serviceable by RAN 100, or some other parameter. Responsive to a determination that the quantity is below the deactivation threshold value, the network entity may deactivate the control channel signal.

In a preferred embodiment, the methods and systems may be implemented under a wireless communication system 100 in which the first air interface protocol 104a is compliant with the well known IS-856 standard, and the second air interface protocol 104b is compliant with the well known IS-2000 standard. Publications describing both the IS-856 standard and IS-2000 standard are available from the Third Generation Partnership Project and may be found at http://www.3gpp2.org/public_html/specs/index.cfm. All revisions of both the IS-856 standard and the IS-2000 standard are contemplated here. The following 3GPP2 publications describing or corresponding to the IS-856 and IS-200 standards are hereby incorporated by reference in their entirety: C.S0024-0 v2.0; C.S0024-0 v3.0; C.S0024-0 v4.0; C.S0024-A v1.0; C.S0001-A; C.S0001-C v2.0; C.S0002-0-2; C.S0002-0 v3.0; C.S0002-A-1 v1.0; C.S0002-A v5.0;

A.S0017-A v2.0.1; C.R1001-0 v1.0; C.R1001-A v2.0; C.S0001-0 v1.0; C.S0001-0-2 v1.0; C.S0001-0 v3.0; C.S0001-A v5.0; C.S0001-B v1.0; C.S0001-C v1.0; C.S0001-D v1.0; C.S0002-0 v1.0; C.S0002-A; C.S0002-A v6.0; C.S0002-B v1.0; C.S0002-C v1.0; C.S0002-C v2.0; C.S0002-D v1.0; C.S0003-0 v1.0; C.S0003-0-2 v1.0; C.S0003-0 v3.0; C.S0003-A; C.S0003-A-1 v1.0; C.S0003-A v5.0; C.S0003-A v6.0; C.S0003-B v1.0; C.S0003-C v1.0; C.S0003-C v2.0; C.S0003-D v1.0; C.S0004-0 v1.0; C.S0004-0-2 v1.0; C.S0004-0 v3.0; C.S0004-A; C.S0004-A v2.0; C.S0004-A v5.0; C.S0004-A v6.0; C.S0004-B v1.0; C.S0004-C v1.0; C.S0004-C v2.0; C.S0004-D v1.0; C.S0005-0 v1.0; C.S0005-0-2 v1.0; C.S0005-0 v3.0; C.S0005-A; C.S0005-A-1 v1.0; C.S0005-A v5.0; C.S0005-A v6.0; C.S0005-B v1.0; C.S0005-C v1.0; C.S0005-C v2.0; C.S0005-D v1.0; C.S0006-0 v1.0; C.S0006-0-2 v1.0; C.S0006-0 v3.0; C.S0006-A; C.S0006-A v5.0; C.S0006-A v6.0; C.S0006-B v1.0; C.S0006-C v1.0; C.S0006-C v2.0; C.S0006-D v1.0. Each of the above publications is available at http://www.3gpp2.org/public_html/specs/cref.cfm.

The IS-856 standard may generally be described as including a first air interface protocol 104a that is suitable for high data rate communications, and the IS-2000 standard may generally be described as including a second air interface protocol 104b that is suitable for voice calls and low data rate communications.

Under the second air interface protocol 104b, as defined under IS-2000, BTS 106 serves wireless coverage area 105 with one or more carrier frequencies, typically 1.25 MHz each. Within wireless coverage area 105, BTS 106 can concurrently carry on communications on multiple different channels distinguished by Walsh codes. As a result, when a mobile device 102 operates in a given wireless communication area 105, communications between mobile device 102 and BTS 106 are carried on a given frequency and are encoded by, at least, a given Walsh code.

Generally, under any wireless communication system, air interface communications may be divided into forward link communications, which are those passing from BTS 106 to mobile device 102, and reverse link communications, which are those passing from mobile device 102 to BTS 106. On the forward link of an IS-2000 system, certain Walsh codes are reserved for use to define control channels, which may include a pilot channel, a sync channel, and one or more paging channels and quick paging channels. The remaining Walsh codes can be assigned dynamically for use as traffic channels, i.e., to carry user communications. Similarly, on the reverse link, one or more Walsh codes may be reserved to define access channels, and the remainder can be assigned dynamically for use as traffic channels.

Under IS-2000, the highest rate of packet-data communications theoretically available on a fundamental traffic channel of the forward link is 9.6 kbps, and with a supplemental traffic channel it is 153.6 kpbs. In order to provide higher rate packet-data service to support higher bandwidth applications, the telecommunications industry introduced IS-856, which is a high rate packet data (HRPD) system.

Under the first air interface protocol 104a, as defined under IS-856, RAN 100 is able to leverage the asymmetric characteristics of most high-volume data traffic on a wireless network, such as IP packet-based traffic, where the forward link typically carries a heavier load than the reverse link. For example, when engaged in Internet web-browsing, mobile device 102 typically requests more data then it sends.

Under IS-856, the forward link uses time division multiplexing (TDM) in order to allocate all power in wireless coverage area 105 to a given mobile device 102 at any moment, while the reverse link retains largely the traditional IS-2000 code division multiplexing (CDM) format. An IS-856 forward link may be divided into time slots of length 2048 chips, and each time slot may be further time division multiplexed to carry various channels, including a pilot channel, a Medium Access Control (MAC) channel, and, if any traffic exists, a forward traffic channel and a control channel. The end result is that a mobile device 102 operating under IS-856 Rev. 0 can, in theory, receive data at a rate of at least 38.4 kbps and up to 2.4 Mbps, and for IS-856 Rev. A up to 3.1 Mbps.

Given the commonality of IS-2000 systems, IS-856 was designed to be backwards compatible and to facilitate hybrid operation with IS-2000 systems. A typical hybrid mobile device 102, for instance, may be capable of receiving voice calls and short message service (SMS) messages under IS-2000 protocols, and high-speed packet data service under IS-856 protocols.

In a hybrid system, IS-2000 and IS-856 coverage are provided on different carrier frequencies, each of which is 1.25 MHz in bandwidth for consistency with legacy operation. Further, most IS-856 systems are provided as overlays on existing IS-2000 systems, such that a given BSC provides either IS-2000 coverage or both IS-2000 and IS-856 coverage.

For a given IS-2000 non-hybrid wireless coverage area, a BSC may have just an IS-2000 circuit card to provide IS-2000 services. For a hybrid IS-2000/IS-856 wireless coverage area 105, on the other hand, BSC 108 may have both an IS-2000 circuit card and an IS-856 circuit card. A typical mobile device 102 will be programmed to use the IS-856 air interface protocol 104a when faced with the choice between IS-856 and IS-2000, i.e., when in a hybrid wireless coverage area 105; though, mobile device 102 may still use the IS-2000 air interface protocol 104b for voice and other services when in the hybrid wireless coverage area 105.

Figure 2:
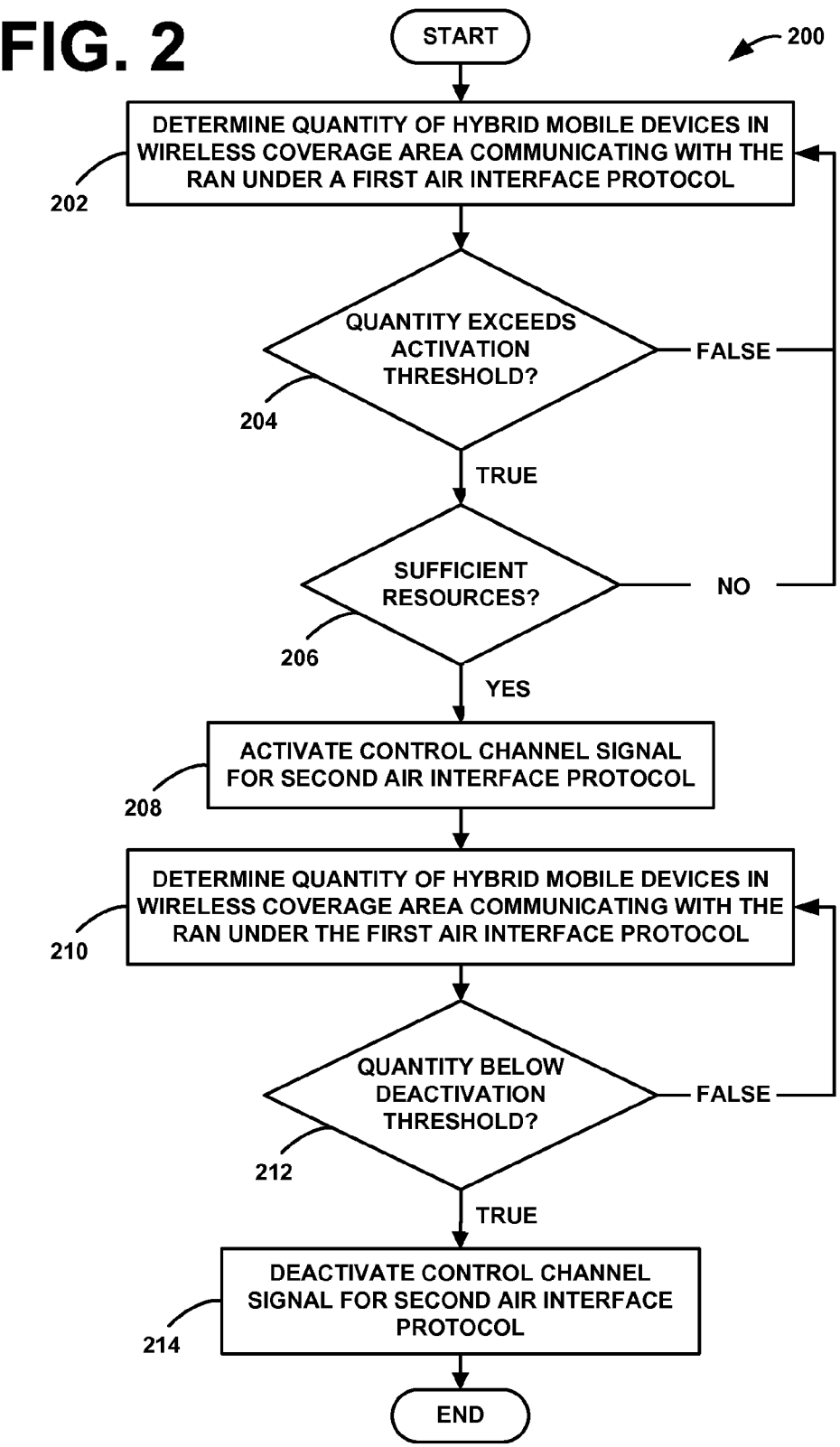
FIG. 2 is a flow chart depicting functions that can be carried out in accordance with an exemplary embodiment.

FIG. 2 is a generalized flow chart 200 depicting operation of an exemplary embodiment using the IS-856 and IS-2000 air interface protocols. One or more of the entities shown in FIG. 1—preferably a base station, BTS 106, or BTS 108—may accomplish the method steps illustrated in FIG. 2.

In relation to FIGS. 1 and 2, RAN 100 may be serving a plurality of mobile devices 102 in wireless coverage area 105 via a base station (e.g., BTS 106 and BSC 108). Each of the mobile devices 102 may be communicating with RAN 100 under the IS-856 protocol, though each mobile device 102 may periodically switch to the IS-2000 protocol to check an IS-2000 paging channel for page messages, and then switch back to the IS-856 protocol.

At step 202 in the exemplary embodiment, a network entity (preferably BSC 108, though other network entities such as BTS 106 and/or MSC 116 are contemplated additionally or alternatively) may determine the quantity (Q) of mobile devices 102 that are within wireless coverage area 105 and that are communicating with RAN 100 under the IS-856 protocol. For example, BSC 108 may query the mobile devices 102 with which it is communicating under the IS-856 protocol and count the number of mobile devices 102 that respond to the query from wireless communication area 105. Alternatively, each mobile device 102 may have previously registered with RAN 100 upon beginning communications under the IS-856 protocol within wireless communication area 105. Each registration may be stored in a registration table located at, for example, BSC 108 or MSC 116, and BSC 108 may count the current registrations within the registration table.

At step 204, the network entity may determine whether Q exceeds an activation threshold value. For example, BSC 108 may read the activation threshold value from a data table located in data storage at BSC 108, and then compare it to Q. If Q is greater than the activation threshold value, then step 206 may be executed. If Q is less than the activation threshold value, then BSC 108 may continue cycling through steps 202 and 204 until Q exceeds the activation threshold value. In an alternative embodiment not shown in FIG. 2, if Q is greater than the activation threshold value, step 208 may be executed after step 204, instead of step 206.

At step 206, the network entity may determine whether there are sufficient network resources available in RAN 100 to allow activation of a control channel signal, such as a quick paging channel. For example, BSC 108 may determine whether BTS 106 has sufficient transceiver power to broadcast an additional control channel (e.g., the quick paging channel) in wireless coverage area 105. BSC 108 may do this by querying BTS 106 as to the amount of power its transmitter is currently using and then comparing the power value received from BTS 106 to a power threshold value read from a data table located in data storage at BSC 108 or another network entity. If the power value reported by BTS 106 is lower than the power threshold value, then step 208 may be executed. If the power value reported by BTS 106 is greater than the power threshold value, then BSC 108 may continue cycling through steps 202, 204, and 206 until sufficient resources are available to activate a control channel at step 208. Alternatively, the BSC 108 may query BTS 106 as to the amount of power its transmitter currently has available for use (i.e., excess power capacity) and then compare the power value received from BTS 106 to a power threshold value read from a data table located in data storage at BSC 108 or another network entity. If the power value reported by BTS 106 is greater than the power threshold value, then step 208 may be executed. If the power value reported by BTS 106 is lower than the power threshold value, then BSC 108 may continue cycling through steps 202, 204, and 206 until sufficient resources are available to activate a control channel at step 208.

Additionally or alternatively, BSC 108 may determine whether there are unused Walsh codes available for encoding a control channel, such as a quick paging channel. For example, a data table at BSC 108 may store the assignments of all Walsh codes for all coverage areas served by BSC 108, including wireless coverage area 105. BSC 108 may query the table to determine if there is at least one Walsh code available for wireless coverage area 105 for assignment to a control channel. Alternatively, BSC 108 may read an available code threshold value from a data table located in data storage at BSC 108 and compare that to a value obtained when BSC 108 queries the Walsh code storage table to determine the number of unassigned Walsh codes. If there are sufficient Walsh codes available (e.g., one Walsh code), then step 208 may be executed. If there are insufficient Walsh codes available (e.g., no Walsh codes), then BSC 108 may continue cycling through steps 202, 204, and 206 until sufficient resources are available to activate a control channel at step 208.

Additionally or alternatively, BSC 108 may determine whether there is excess channel element capacity available at BTS 106 for activation of a control channel, such as a quick paging channel. Every BTS has a number of channel elements and each channel element provides hardware and software resources for controlling a wireless communication link with the mobile devices 102, including controlling the channels on the communication link. Each channel element has only a finite capacity, i.e., it can only enable so many channels (perhaps even just one channel) at a given time. BSC 108 may query BTS 106 to determine if one or more channel elements have sufficient capacity to control an additional channel. Alternatively, BSC 108 may read a channel capacity threshold value from a data table located in data storage at BSC 108 and compare that to a value obtained when BSC 108 queries BTS 106 to determine the excess capacities of each channel element at BTS 106. If there is sufficient channel capacity available, then step 208 may be executed. If there is insufficient channel capacity available, then BSC 108 may continue cycling through steps 202, 204, and 206 until sufficient resources are available to activate a control channel at step 208.

At step 208, the network entity may activate a control channel signal for the IS-2000 protocol within wireless coverage area 105. For example, BSC 108 may instruct a channel element capable of broadcasting into wireless coverage area 105 to begin broadcasting an IS-2000 quick paging channel.

Once a control channel signal for the second air interface protocol 104b (i.e., the IS-2000 protocol) has been activated, the network entity may monitor wireless coverage area 105 to determine when the number of mobile devices 102 communicating under the first air interface 104b protocol falls below a threshold deactivation value. At step 210, the network entity may first determine the quantity (Q) of mobile devices 102 that are within wireless coverage area 105 and that are communicating with RAN 100 under the IS-856 protocol. For example, BSC 108 may query the mobile devices with which it is communicating under the IS-856 protocol and count the number of mobile devices 102 that respond to the query from the wireless communication area 105. Alternatively, BSC 108 may count the current registrations within the registration table previously described with respect to step 202.

At step 212, the network entity may then determine whether Q falls below a deactivation threshold value. For example, BSC 108 may read the deactivation threshold value from a data table located in data storage at BSC 108, and then compare it to Q. If Q is less than the deactivation threshold value, then step 214 may be executed. If Q is greater than the deactivation threshold value, then BSC 108 may continue cycling through steps 210 and 212 until Q falls below the deactivation threshold value.

At step 214, the network entity may deactivate the control channel signal for the second air interface protocol 104b located within wireless coverage area 105. For example, BSC 108 may instruct BTS 106 to stop broadcasting the IS-2000 quick paging channel activated in step 208.

It should be understood that each of the entities involved in this process can be processor-controlled, and so the functions described herein can be carried out by a processor executing machine language instructions. Alternatively, the various functions described herein can be carried out by any combination of hardware, firmware, and/or software.

Figure 3:
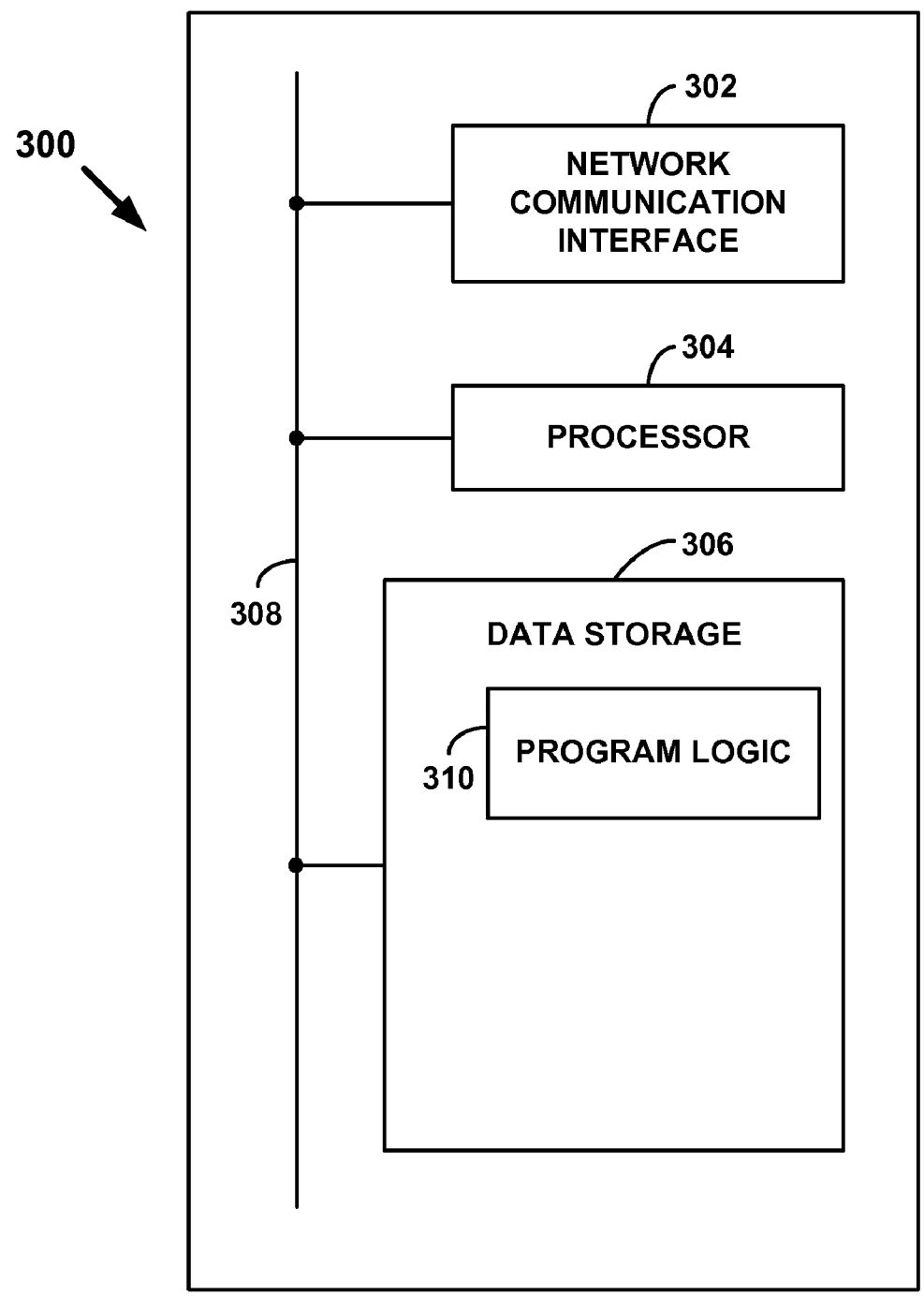
FIG. 3 is a simplified block diagram of an exemplary network entity operable within the communication system of FIG. 1.

FIG. 3 is a block diagram depicting an exemplary embodiment of a network entity 300 operable in system 100 and capable of performing the functions described herein, including those functions described with respect to FIG. 2. Network entity 300 may be BTS 106, BSC 108, MSC 116, or another network entity communicatively coupled to system 100. Alternatively, network entity 300 may be part of BTS 106, BSC 108, MSC 116, or another network entity communicatively coupled to system 100.

In a preferred embodiment, network entity 300 may be BSC 108, or part of BSC 108. As BSC 108 or part of BSC 108, network entity 300 could readily determine network resources, determine the number of mobile device 102 accessing wireless coverage area 105, and activate and deactivate control channels, such as quick paging channels. Network entity 300 may include a network communication interface 302, a processor (i.e., one or more processors) 304, and data storage 306, all of which are communicatively coupled through a system bus 308. Other arrangements are possible as well.

Network communication interface 302 may include one or more chipsets for performing network communications with the rest of the system 100 and potentially with the mobile devices 102. Performing network communications may include transmitting and/or receiving data using a wireless connection and/or using a fixed, physical connection, such as metal wire or fiber optic cable.

If network entity 300 is BTS 106 or another BTS, network communication interface 302 preferably includes a chipset for performing wireless communications. For example, network communication interface 302 may have a chipset for performing IS-2000, IS-856, or hybrid IS-2000/IS-856 wireless communications. As a more specific example, a wide variety of CDMA Digital Modules, available from Alcatel-Lucent of Murray Hill, N.J., can be used to perform IS-856, IS-2000, or hybrid wireless communications.

Regardless of whether network entity 300 is a BTS, network communication interface 302 may also include a chipset for performing wireline communications. Such a chipset may be mounted on a network interface card (NIC). An exemplary NIC with a chipset for performing wireline communications according to the Institute of Electrical and Electronics Engineers (IEEE) 802.3® standard for Carrier Sense Multiple Access with Collision Detection (CSMA/CD) Access Method is the SP2210R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

Network communication interface 302 may transmit various types of data to the mobile devices 102 and/or receive various types of data from the mobile devices 102. Additionally, network communication interface 302 may communicate with other network entities.

Data storage 306 may comprise one or more volatile and/or nonvolatile storage components such as magnetic, optical, or organic storage and may store various types of data. Data storage 306 may store program logic 310 (e.g., program instructions) executable by processor 304. Program logic 310 may contain instructions executable by processor 304 to provide services such as determining or receiving information about network resources, determining or receiving information about the quantity of mobile devices 102 accessing wireless coverage area 105 under various air interface protocols, activating and deactivating control channels (e.g., turning on channel broadcasts by channel elements), and looking up information (e.g., various threshold values) in data storage 306. The foregoing example of program logic 310 is intended to be exemplary only. For example, processor 304 may use instructions contained in program logic 310 to accomplish other functions, such as any of the functions described in method 200. Further, it should be understood that program instructions stored in data storage 306 are executable by processor 304 to carry out any of the network-related functions described herein.

Exemplary embodiments have been shown and described herein. Those of ordinary skill in the art will appreciate that numerous modifications from the embodiments described are possible, while remaining within the scope of the claims.

We claim:

1. A method comprising:
    determining a quantity of hybrid mobile devices in a wireless coverage area served by a radio access network (RAN) that are communicating with the RAN under a first air interface protocol, wherein each hybrid mobile device is capable of communicating with the RAN under the first air interface protocol and under a second air interface protocol, and wherein each hybrid mobile device is arranged to switch between communication under the first air interface protocol and communication under the second air interface protocol;
    making a determination that the quantity exceeds an activation threshold value; and
    responsive to the determination that the quantity exceeds the activation threshold value, activating a control channel signal for the wireless coverage area under the second air interface protocol.

2. The method of claim 1, further comprising:
    making a determination that the quantity of hybrid mobile devices in the wireless coverage area that are communicating with the RAN under the first air interface protocol is below a deactivation threshold value; and
    responsive to the determination that the quantity is below the deactivation threshold value, deactivating the control channel signal.

3. The method of claim 1, further comprising conditioning activation of the control channel signal on making a resource determination that there are sufficient network resources available in the RAN to allow transmission of the control channel signal.

4. The method of claim 3, wherein the resource determination comprises:
    determining an amount of signal transmission power used by the RAN serving the wireless coverage area; and
    making a determination that the amount of signal transmission power falls below a power threshold value.

5. The method of claim 3, wherein the resource determination comprises:
    determining an amount of excess signal transmission power available to the RAN serving the wireless coverage area; and
    making a determination that the amount of excess signal transmission power is greater than a power threshold value.

6. The method of claim 3, wherein the resource determination comprises:
    determining an amount of unused Walsh Codes available to the RAN for serving the wireless coverage area; and
    making a determination that the amount of unused Walsh Codes exceeds an available code threshold value.

7. The method of claim 3, wherein the resource determination comprises:
    determining an amount of excess channel element capacity available to the RAN for serving the wireless coverage area; and
    making a determination that the amount of excess channel element capacity exceeds a channel capacity threshold value.

8. The method of claim 1, wherein the first air interface protocol comprises an IS-856 protocol, and wherein the second air interface protocol comprises as IS-2000 protocol.

9. The method of claim 1, wherein the control channel is a Quick Paging Channel.

10. In a wireless communication system in which a radio access network (RAN) serves a plurality of hybrid wireless mobile devices in a wireless coverage area, wherein each hybrid mobile device is adapted to communicate with the RAN according to both a first air interface protocol and a second air interface protocol, and wherein each hybrid mobile device is arranged to switch between communication under the first air interface protocol and communication under the second air interface protocol, a network entity comprising:
  a network interface for providing connectivity with the RAN;
  a processor;
  data storage; and
  program instructions stored in the data storage and executable by the processor to carry out functions including:
    (i) determining a quantity of hybrid mobile devices in a wireless coverage area communicating with the RAN under a first air interface protocol;
    (ii) making a determination that the quantity exceeds an activation threshold value; and
    (iii) responsive to the determination that the quantity exceeds the activation threshold value, activating a control channel signal for wireless coverage area under the second air interface protocol.

11. The network entity of claim 10, wherein the program instructions may further carry out functions including:
  making a determination that the quantity of hybrid mobile devices in the wireless coverage area that are communicating with the RAN under the first air interface protocol is below a deactivation threshold value; and
  responsive to the determination that the quantity is below the deactivation threshold value, deactivating the control channel signal.

12. The network entity of claim 10, wherein the program instructions may further carry out functions including conditioning activation of the control channel signal on making a resource determination that there are sufficient network resources available in the RAN to allow transmission of the control channel signal.

13. The network entity of claim 12, wherein the resource determination comprises:
  determining an amount of signal transmission power used by the RAN serving the wireless coverage area; and
  making a determination that the amount of signal transmission power falls below a power threshold value.

14. The network entity of claim 12, wherein the resource determination comprises:
  determining an amount of excess signal transmission power available to the RAN serving the wireless coverage area; and
  making a determination that the amount of excess signal transmission power fate is greater than a power threshold value.

15. The network entity of claim 12, wherein the resource determination comprises:
  determining an amount of unused Walsh Codes available to the RAN for serving the wireless coverage area; and
  making a determination that the amount of unused Walsh Codes exceeds an available code threshold value.

16. The network entity of claim 12, wherein the resource determination comprises:
  determining an amount of excess channel element capacity available to the RAN for serving the wireless coverage area; and
  making a determination that the amount of excess channel element capacity exceeds a channel capacity threshold value.

17. The network entity of claim 10, wherein the first air interface protocol comprises an IS-856 protocol, and wherein the second air interface protocol comprises as IS-2000 protocol.

18. The network entity of claim 10, wherein the control channel is a Quick Paging Channel.

* * * * *